(12) United States Patent
Hutchison et al.

(10) Patent No.: US 8,001,197 B2
(45) Date of Patent: Aug. 16, 2011

(54) EMAIL ROUTING

(75) Inventors: Gordon Douglas Hutchison, Eastleigh (GB); Joseph Robert Winchester, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 12/409,736

(22) Filed: Mar. 24, 2009

(65) Prior Publication Data
US 2009/0248819 A1    Oct. 1, 2009

(30) Foreign Application Priority Data
Apr. 1, 2008   (GB) .................................. 08153910.8

(51) Int. Cl.
*G06F 15/16*   (2006.01)

(52) U.S. Cl. ....................................................... 709/206

(58) Field of Classification Search .................. 709/206
See application file for complete search history.

(56) References Cited

U.S. PATENT DOCUMENTS

| | | | | |
|---|---|---|---|---|
| 5,829,003 | A * | 10/1998 | Okura | 707/100 |
| 7,219,129 | B2 * | 5/2007 | Weissman | 709/206 |
| 2003/0191806 | A1 | 10/2003 | Osterberg, Jr. et al. | |
| 2004/0221012 | A1 * | 11/2004 | Heumesser | 709/206 |
| 2005/0086244 | A1 | 4/2005 | Morinville | |
| 2006/0041624 | A1 | 2/2006 | Lyle et al. | |
| 2006/0168038 | A1 * | 7/2006 | Lin | 709/206 |
| 2009/0157828 | A1 * | 6/2009 | Agrawal | 709/206 |

* cited by examiner

*Primary Examiner* — Philip C Lee
(74) *Attorney, Agent, or Firm* — Law Office of Jim Boice

(57) ABSTRACT

A method of routing an email message comprises receiving a message to be routed, receiving details of a first recipient of the message, receiving an indication of a second recipient of the message, the indication defining a relationship to the first recipient, obtaining an address for the first recipient, obtaining an address for the second recipient, and transmitting the email message to the first and second recipients.

19 Claims, 6 Drawing Sheets

EMAIL ROUTING

TECHNICAL FIELD

The present invention relates to a method, system, and computer readable medium for routing an email message. More specifically, the present invention relates to the identification of individuals in an email by their relationships in an organizational structure.

DESCRIPTION OF THE RELATED ART

Electronic mail (email) is a service that allows users to communicate with one another via a computer network. Each recipient of an email message is typically identified by an address that consists of a name and a server address, for example, "fred@companyabc.com". When an email is sent, the destination server is first located. Thereafter, upon receipt of the email, the destination server places the message into the intended recipient's inbox. In the example of "fred@companyabc.com", the domain name of the email server is "companyabc.com" and "Fred" is a symbol identifying the recipient. The routing of the message is carried out by one or more servers in a path from the originating client device to the inbox of each of the named recipients.

Email aliases exist to allow a level of redirection in the routing of email messages. This allows a system to cope with the situation in which the recipient of the email is identified by, for example, their role within an organization, rather than their name. For example "administrator@companyabc.com" is an alias, as is "salesdepartment@companyabc.com". In these situations, the email reaches the intended recipient either by an individual checking the inbox for the alias, or else having the companyabc email server forwarding the email to a particular individual who is assuming responsibility for that role. In the example where Fred Smith is currently the sales manager for companyabc, individuals who wish to contact the sales department address their emails to "salesdepartment@companyabc.com", and the email server at companyabc redirects these emails to Fred Smith's in-box. This forwarding, or rerouting, of the email message is carried out invisibly as far as the original sender of the message is concerned.

If Fred changes role and another individual, such as Abby Smyth becomes the sales manager, the alias will need updating, and all emails addressed to the sales department will then be routed to reach Abby's inbox. The advantage of this over having the physical inbox address of the sales manager is that a change in role of the sales manager is insulated within companyabc, which does not need to notify people who have been using the alias, and people's address books, external literature, and other media in which the address has been recorded do not need modifying. The individual has been identified logically by their role at companyabc, rather than a symbol representing the explicit person. This decoupling allows the person occupying the role to change without anyone outside of companyabc having to be informed or affected.

While many email messages are directed to a single recipient, oftentimes such email messages are sent to multiple recipients, including recipients who have a business relationship to one another. For example, an email may be sent from "Joe" to "Bob", with a copy being sent to his manager "Mary." During the exchange back and forth of the original message and subsequent messages between Joe and Bob, Mary may be replaced by Joan as Bob's manager. Nonetheless, Mary (and not Joan) will continue to receive messages to Bob, even though Mary is no longer interested in these messages.

SUMMARY OF THE INVENTION

In one embodiment of the present invention, there is provided a method of routing an email message that comprises receiving a message to be routed; receiving details of a first recipient of the message; receiving an indication of a second recipient of the message, the indication defining a relationship to the first recipient; obtaining an address for the first recipient; obtaining an address for the second recipient; and transmitting the email message to the first and second recipients.

According to another embodiment of the present invention, there is provided a system for routing an email message, in which the system comprises a computer that is architected to receive a message to be routed, to receive details of a first recipient of the message, and to receive an indication of a second recipient of the message, the indication defining a relationship to the first recipient; and a server arranged to obtain an address for the first recipient, to obtain an address for the second recipient, and to transmit the email message to the first and second recipients.

According to another embodiment of the present invention, there is provided a computer program product on a computer readable medium for generating an email message, the computer program product comprising instructions for receiving a message to be routed, receiving details of a first recipient of the message, and for receiving an indication of a second recipient of the message, the indication defining a relationship to the first recipient.

BRIEF DESCRIPTION OF THE DRAWINGS

Embodiments of the present invention will now be described, by way of example only, with reference to the accompanying drawings, in which.

DETAILED DESCRIPTION OF THE PREFERRED EMBODIMENT

Figure 1:
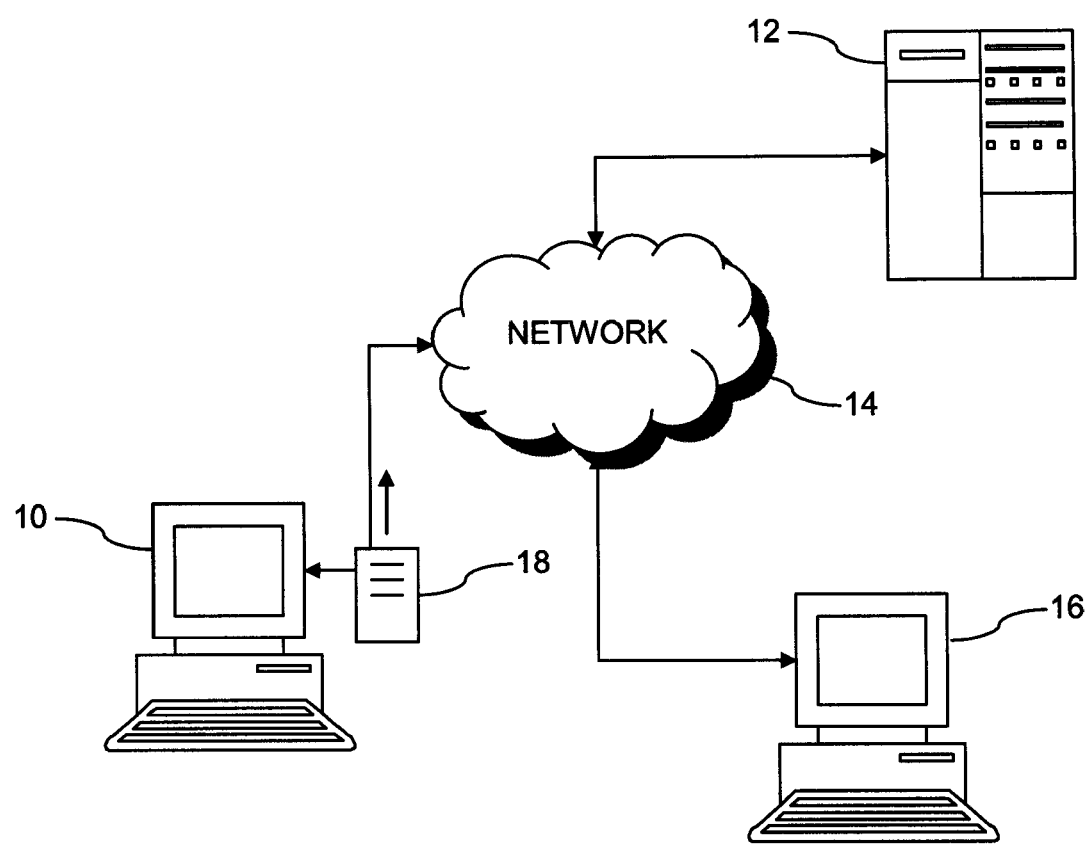
FIG. 1 is a schematic diagram of an exemplary system for routing an email.

FIG. 1 shows an example of an email system, in a very simplified form. A client device 10 is connected to an email server 12 via a network 14. A further client device 16 is also shown as connected to the network 14. In most practical implementations of email systems, the system will be comprised of a large number of client devices and possibly multiple email servers. An email message 18 is shown as being sent by the client device 10. The client device 10 will be running a client program (an email client) that will provide a graphical user interface which will allow a user to create the body (text) of the email message and to select one or more recipients of the email. When the user selects "send" for the email message 18, then the client device will forward the email to the email server 12 which will be responsible for sending the email to the correct inbox of the (or each) recipient.

In the prior art systems, there are two ways to address an email. Either the user names the recipient using the standard nomenclature of "person@server", or the user will name an alias such as "salesteam@server", which is then routed by the appropriate server. However, this can lead to problems. For example, imagine a corporate email within a large company which has been addressed to staff members Gordon and Joe and addressed to their current managers, Jon and Andy. This email was sent as an action item on an earlier email which was created when Gordon and Joe's managers were Jon and Andy respectively.

A problem occurs if the organizational structure present at the time the earlier email message was composed changes during a period when the content of the message is being dealt with. In the example of an individual and their manager, if the manager changes or the individual moves to a new part of the organization, "reply to all" will send the later message to the old manager who then has to forward it to the new manager (if the old manager is still at the organization). In the example above, if both Gordon and Joe have new managers at the time the later composed email was sent, then both of the old managers need to manually re-direct the email to the new managers. The issue exists in known systems, because a dynamic relationship "send a message to this person and copy their manager" becomes a static disconnected set of two email addresses at the point when the message is first composed.

In the example above the later email was generated using stale manager data. Each of the "To:" recipients above had to either manually forward the email to their current manager or forgo the benefit of manager notification. This creates unnecessary work. Furthermore, the example above may relate to a "good" email and the motive for not manually forwarding the note to the correct manager was modesty and consideration for the manager's inbox size. If the email was negative in nature or the recipient is very busy, he/she has less reason to manually correct the cc list.

One embodiment of the present invention provides a solution that makes the dynamic relationship between individuals in the email's list of recipients semantically captured in the message, so that if the individuals' relationships change, the intended recipient is always located. This solution takes advantage of the fact that many organizations such as corporations, universities, and so forth typically have databases that describe the organizational structure that can be used to resolve the relationship between individuals. The system of the present invention is adapted to allow the user to specify, when listing the intended recipients of an email, a relationship to a previous recipient, rather than a named individual.

Figure 2:
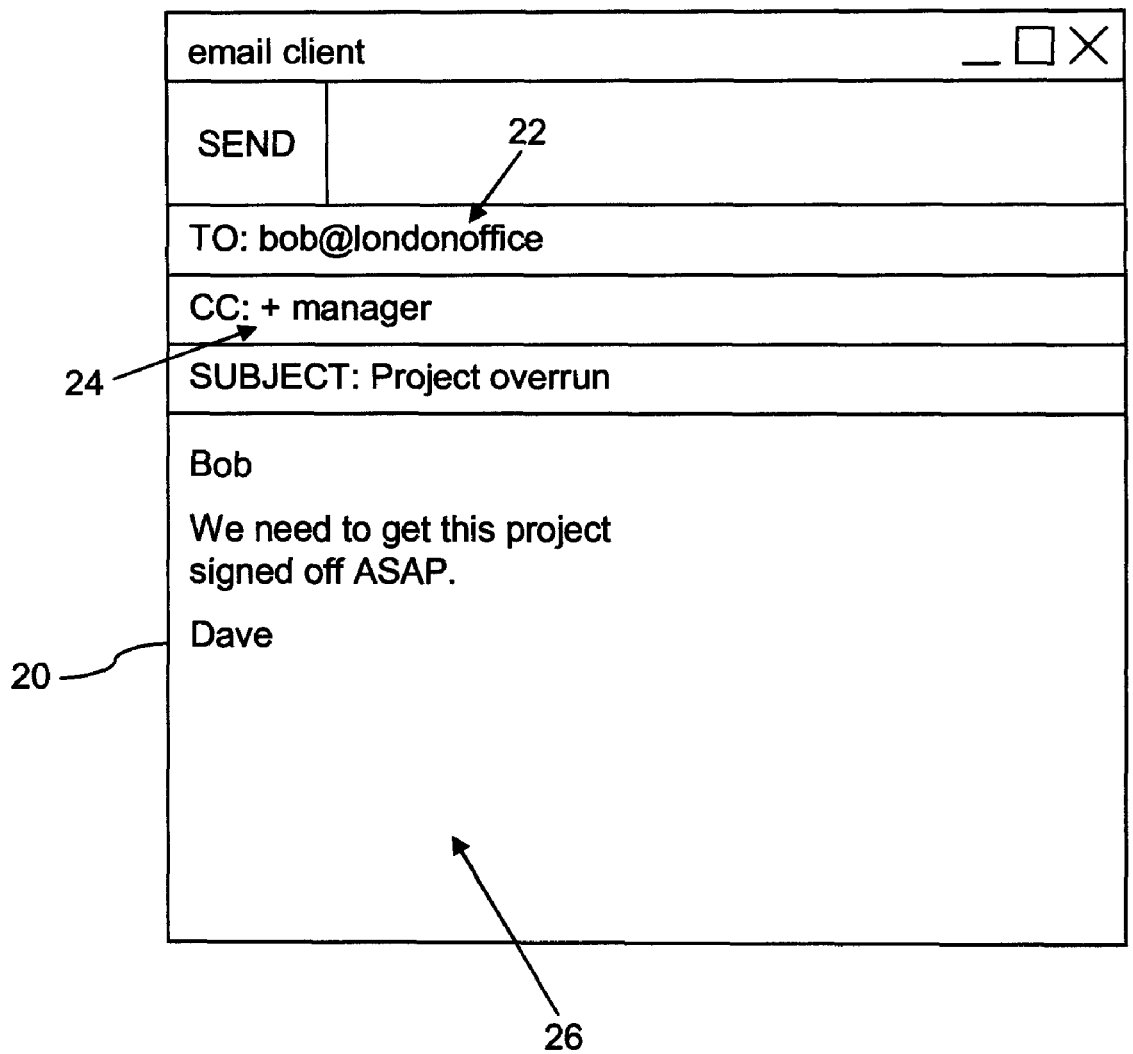
FIG. 2 is a schematic diagram of a graphical user interface for an email.

As an example, if a user wishes to send a message to Bob and their manager, he can compose the email addressee as "bob@londonoffice+<manager>". This is illustrated in the graphical user interface 20 shown in FIG. 2. In the email client device 10 shown in FIG. 1, the user can enter in the address field 22 the details of the first recipient of the message, in this example being the email address "bob@londonoffice", and can additionally specify a further recipient by using an indication 24 (manager) which is an indication of a second recipient of the message, the indication 24 defining a relationship to the first recipient. The "+" sign is used as a predefined user input, the predefined user input indicating that a subsequent user input (manager) is the indication 24 defining a relationship to the first recipient. The actual message to be sent within the email message is shown as the text 26.

The dynamic identification of the manager gives the ability to ensure that the current manager and their email address are identified. At the time when an email is composed the predefined syntax (which can take many different forms) is used to capture the relationship of the recipients, for example, To: bob@londonoffice+<manager> can be used all in the same address field, if so desired by the user. When the email message 18 is sent, the email server 12 will resolve the relationship indication, and direct it to the correct individual. This current manager of Bob might have an email address of "peter@londonoffice", and the email server 12 will send the email message 18 to that inbox, in addition to the first named recipient.

Figure 3:
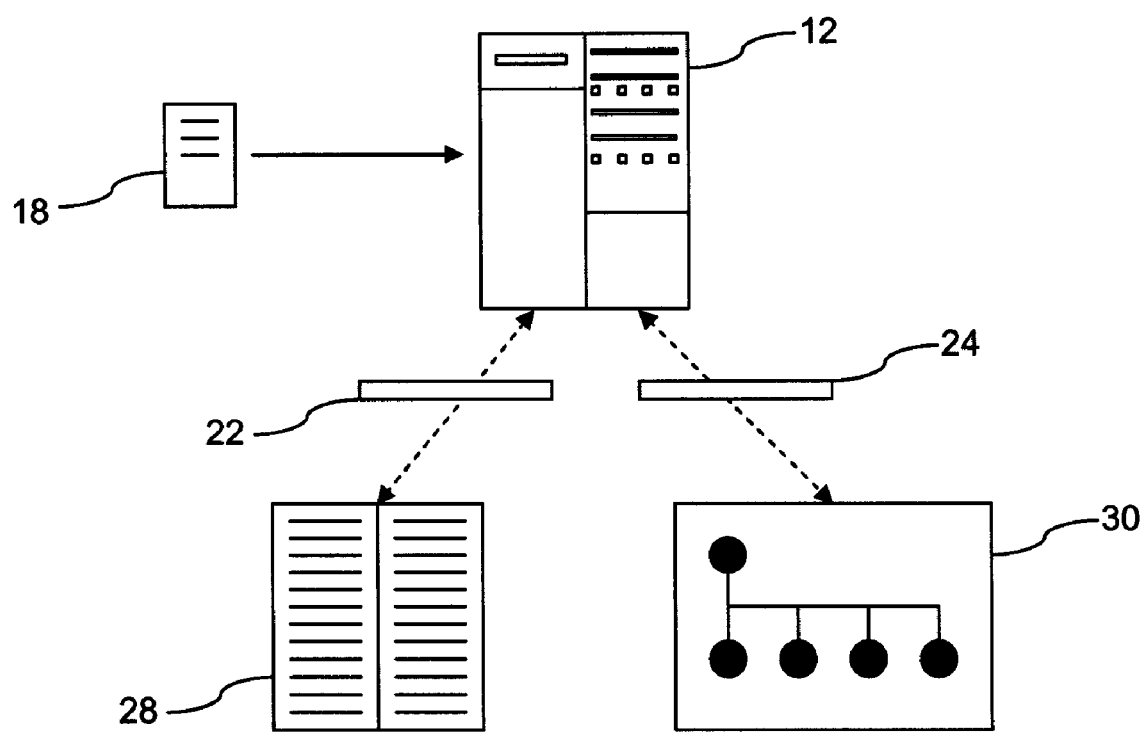
FIG. 3 is a schematic diagram of a server system that may be used by the present invention.

The resolution of the recipients is illustrated in FIG. 3. The email server 12 receives the email message 18, which contains the details (e.g., address field 22) of the first recipient (Bob), and also an indicator 24 of a second recipient (Bob's manager). The email server 12 has stored (or has access to) an email address list 28, and an organizational chart 30. The email address list 28 defines the logical (and/or physical) address of an inbox for the recipients. The server will resolve the indicator 24 (+manager) by referring to the organizational chart 30 to determine the individual recipient who is Bob's manager. The organizational chart 30 will return the result that Peter is the relevant individual, and the email address list 28 can be used by the email server 12 to route the email correctly to the inbox of that individual.

Although the email will be sent to the current person defined by the relationship indication, this will be kept as dynamic information in the recipient list. When replies are created the indication (manager) is always resolved at send time to be the correct individual by looking up the relationship in the organizational database. If Bob changes manager to be "fred@warwickoffice", and later the email is replied to, it is now received by Bob and Fred. This message flow is shown in FIG. 4.

Figure 4:
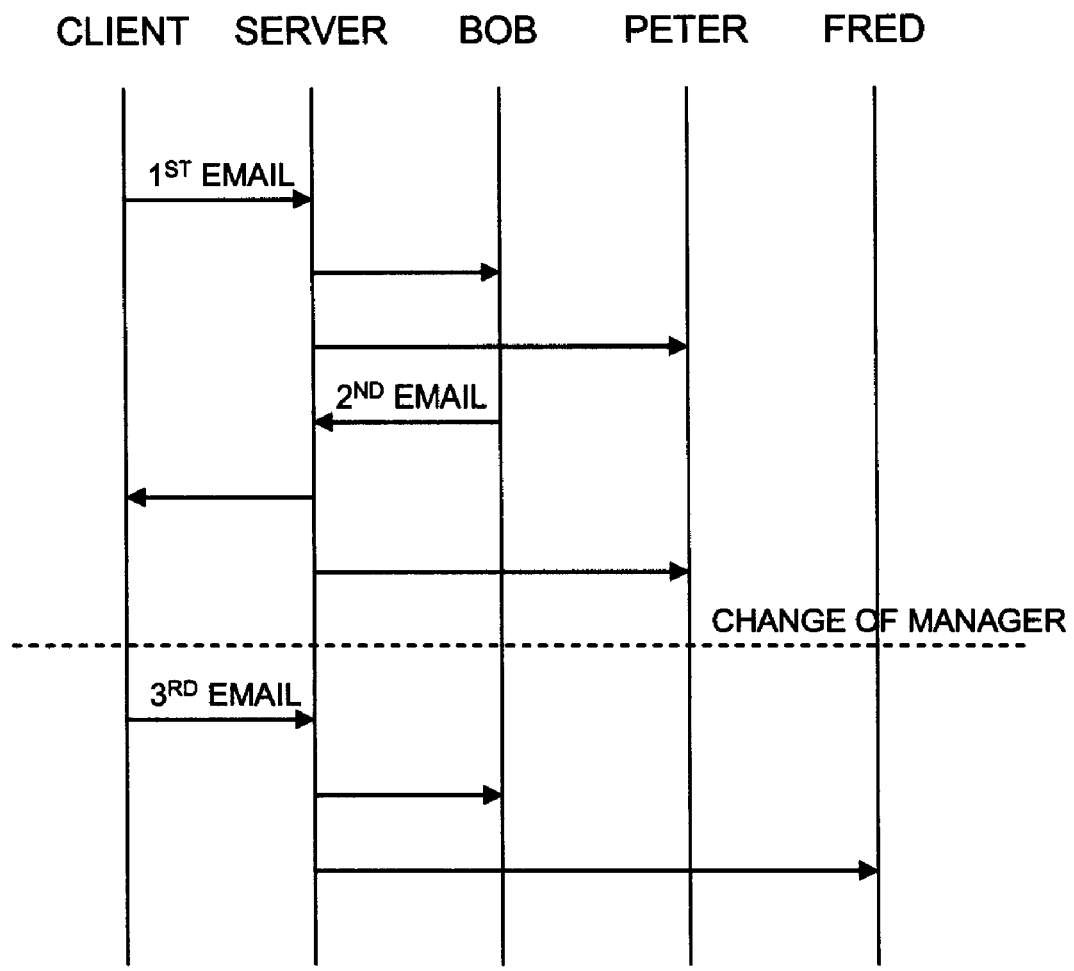
FIG. 4 is a diagram of email message routing in accordance with one embodiment of the present invention.

In FIG. 4, the first email is sent by the user with the address field of "bob@londonoffice+<manager>". The email server 12 resolves this by forwarding the email to Bob (or more accurately Bob's inbox) and to Peter, the current manager of Bob. In fact the original sender of the email may not even know the name of Bob's manager, but this does not affect the correct working of the email routing. The second email is a reply to all by Bob to the original email, which is sent by the email server 12 to the original sender (client) and also to Peter as an original recipient (defined by the indication "manager"). At this point in the email correspondence, which could of course be taking place over a long period of time, there is assumed to be a change in Bob's manager, as illustrated by the dotted line. The third email is also a reply to all by the original client, which is resolved by the email server 12, sending the email to Bob and now to Fred, as the new manager. One advantage of this system is that the indication (manager) is re-resolved every time there is a reply or forward to the existing email thread. The original sender may be completely unaware that Bob's manager has changed.

Figure 5:
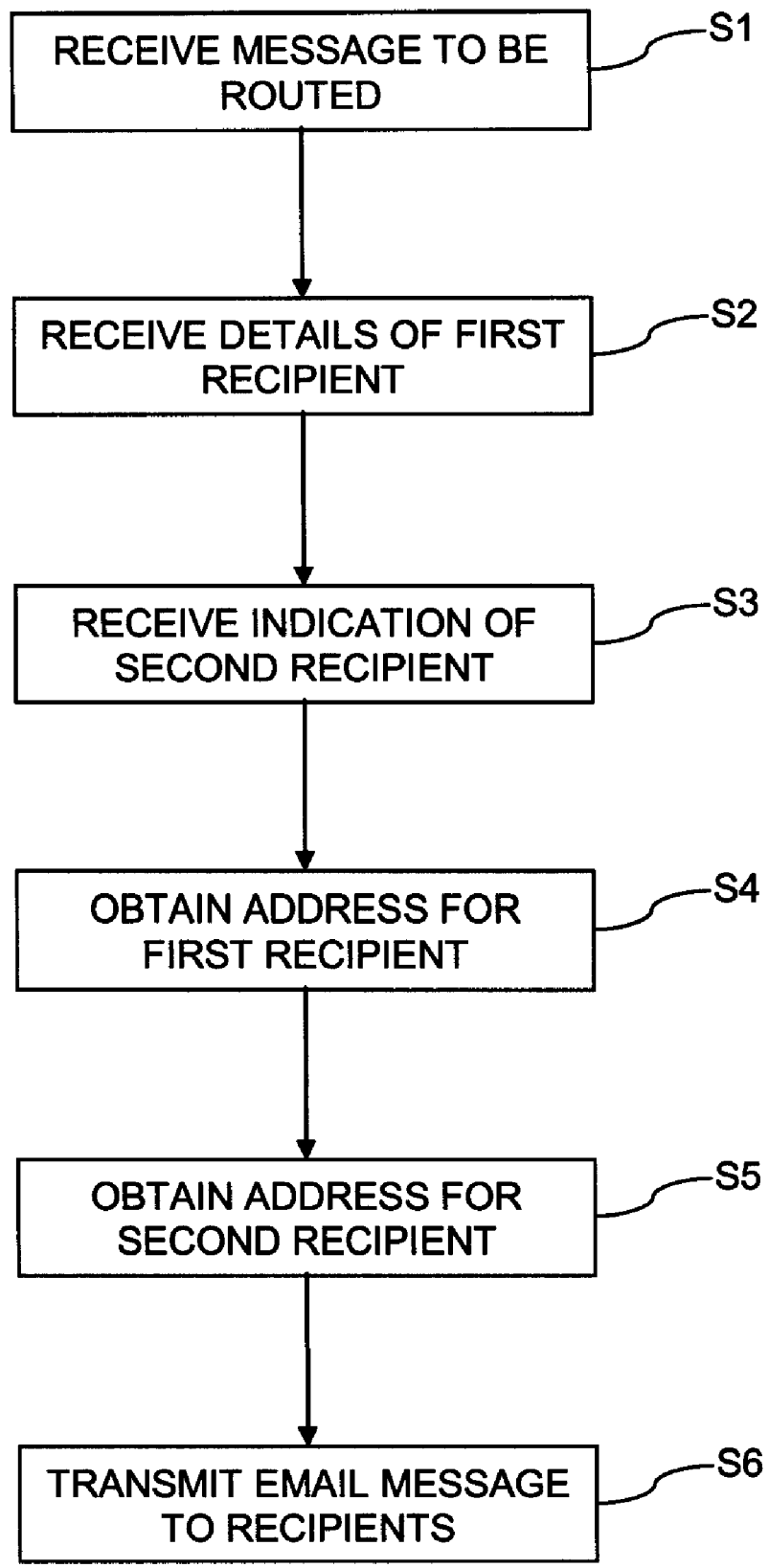
FIG. 5 is a flowchart of a computer-implemented method of routing an email in accordance with one embodiment of the present invention.

The method of routing the email message 18 is summarized in FIG. 5. The method comprises the steps of, at the client device 10, step S1, receiving the message text 26 (shown in FIGS. 2-3) to be routed, step S2, receiving the details (e.g., address field 22) of the first recipient of the message, and step S3, receiving the indicator 24 of the second recipient of the message, the indication 24 defining a relationship to the first recipient. The client device 10 (shown in FIG. 1), through a suitable email client program, is arranged to carry out the above steps. For the user of the email client there is no great difference in the normal creation of an email, except that the user has the possibility to select a recipient of the email on the basis of their relationship to another recipient.

Once the client device 10 has received an instruction from the user, via the user interface 20 (shown in FIG. 2), to send the email, then the email is transmitted to the email server 12, and the second half of the process of FIG. 5 is carried out at the email server 12. This comprises step S4 obtaining an address for the first recipient; step S5 obtaining an address for the second recipient; and step S6, transmitting the email message to the first and second recipients. The email server 12, through whatever means, is able to obtain an address for the recipient who is designated by the indication that the user originally made when they drafted the email at their client device 10. The server then transmits the email to the inbox of that second recipient.

In the above example, the indication defines the relationship of "manager", but equally other relative +relationships such as: +<pa>, +<secretary>, +<myHRrep>, +<2ndline>, +<myattorney> and so on can be used. The email server 12 can be configured to operate in such a way that it can implement the feature that "old" (previous) managers are additionally still copied, when a new email is sent replying or forwarding an older email.

As well as identifying people to send an email to by keeping individuals as an indication through their relationships in an organizational structure, the technique could be used to help view the relationships in received emails. That way when an email is received with multiple people copied, a user can quickly resolve the list in terms of their relationships. For example, if an email is received that includes, Bob@LondonOffice, Peter@LondonOffice as the recipients, the user interface of the email client could be such that it could resolve the relationships to be displayed as:

Bob@LondonOffice+<manager>

This would help the recipient of any email to see the roles and relationships of email recipients. The resolution of the email relative addressee can be done at several points in the sending and receiving process. This can be either at the time the message is composed by the email client device 10 or at the time the message is sent, or received, by the email server 12, as described in the above embodiment. In the most basic implementation the lookup to resolve the relative address occurs at the time the email is being composed and occurs by the email client device 10 having access to the organization structure of the recipients.

In the preferred implementation the resolution from relative recipients to physical addresses occurs by the email server 12 when the email message 18 is dispatched. This could be the case if the email client 10 didn't have access to the organization structure, however the email server 12 did. Such a situation could occur if the resolution was done by the receiving email server 12, for example if the email message 18 was addressed from someone in one company to another company's employee where they wished it to be copied to that employee's manager. In this case, it is unlikely that the sender would have access to the recipient's company's organization database which is typically private information, however because the receiving email server is within the recipient's company the resolution can be made. As noted above there can be multiple email servers in the communication chain between the original sender and the recipient. Exactly where in the chain the resolution of the relative indication takes place will depend upon the topology of the network and also where in the network the specific servers are located relative to the information that is needed to resolve the relative indication.

Although at some point during the transmittal of the email from sender to recipient the addresses which are identified by a relationship to other addresses needs to be physically resolved, the implementation might choose to leave the relative identifier in the addressee list. This means that if the email is replied to the resolution will re-occur, meaning that at anytime during the thread of the email, the intended recipient of the relative address will always be correctly located.

Figure 6:
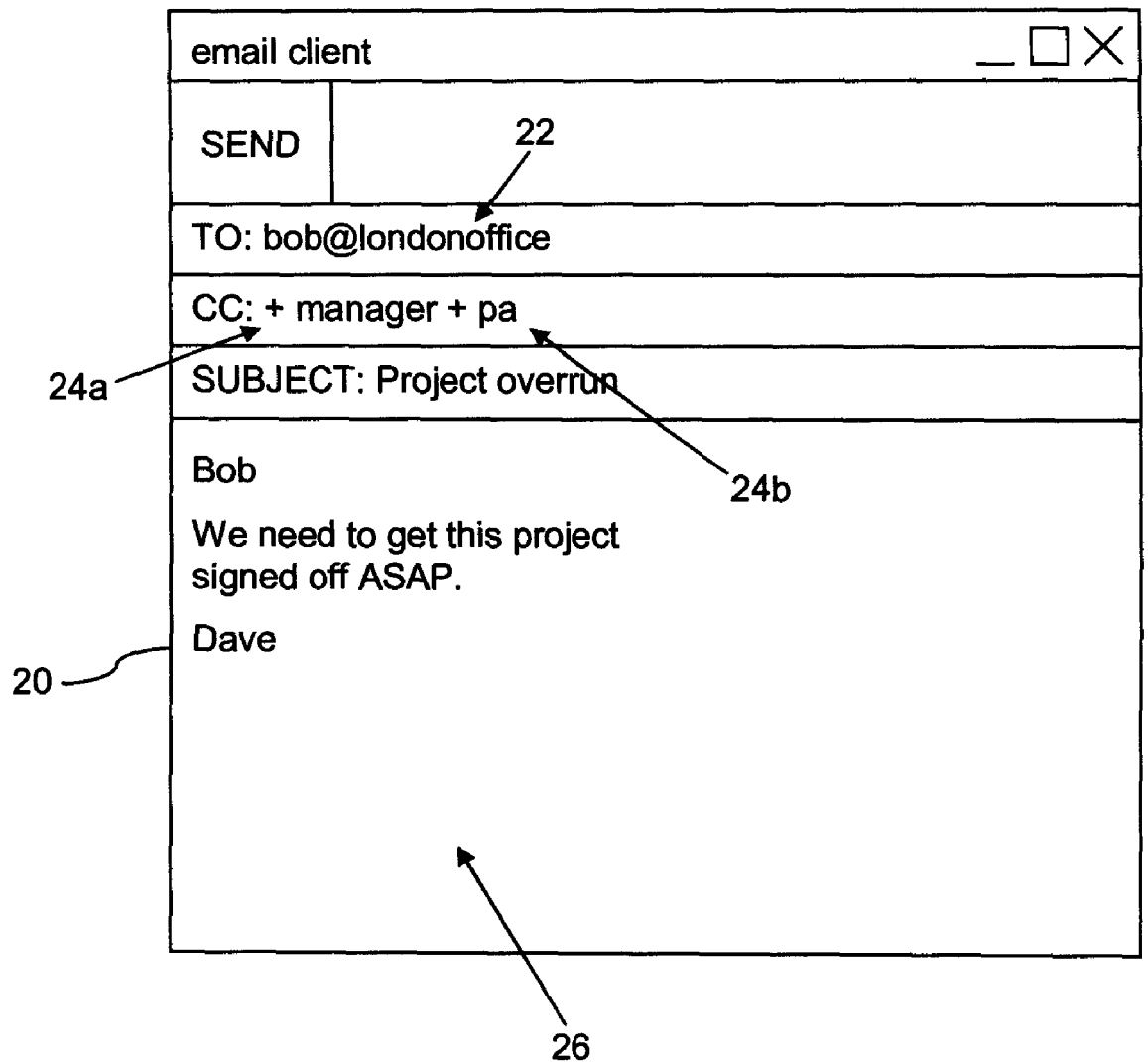
FIG. 6 is a further schematic diagram of a graphical user interface used in the present invention.

FIG. 6 shows a further implementation feature of the system, which allows relative terms used as the indication of the recipient to be effectively nested. Here, the user wishes to send a message to Bob, Bob's manager, and Bob's manager's pa. The user composes the email addressee as bob@londonoffice+<manager>+<pa>. This is shown in the email client 20. The user enters in the address field the details 22 of the first recipient of the message, and additionally specifies a first further recipient by using an indication 24a (manager) which is an indication of a second recipient of the message, and also a second further recipient by using the indication 24b (pa) which is an indication relative to the manager indication. In this way the user can select recipients according to their relationships, without having to specify that relationship directly relative to the first named recipient (Bob).

Owing to the present invention, it is possible to provide an email routing method and system that allows the user, who is composing a message, to select a recipient based upon their relationship to another recipient of the message. For example, the user could select a named individual as the first recipient of an email (such as fred@companyabc.com), and then select as the second recipient someone defined by their relationship to Fred (such as +manager). The server that is routing the message to the "+manager" will resolve the correct address according to, for example, organizational data, without the user needing to know the email address of the manager, or even the name of the person who is the manager of Fred. When the user is drafting the email, they give an indication of a second recipient of the message, the indication defining a relationship (such as manager, pa, secretary etc.) to the first recipient.

In one embodiment, the method of drafting the email further comprises receiving a predefined user input, the predefined user input indicating that a subsequent user input is an indication defining a relationship to the first recipient. To assist in the process of defining a recipient by their relationship to another recipient, when a user is drafting an email, then an identifiable sign (such as the + sign) can be used to designate the subsequent indication as a relationship to a recipient. For example, the user could enter in the address field of the email client "bob@companyabc+pa", where the "bob@companyabc" represents the first recipient, the "+" is the predefined user input indicating that a subsequent user input is an indication defining a relationship to the first recipient, and the "pa" is the indication defining a relationship to the first recipient. When this email is then sent, the appropriate mail server will resolve the "pa" recipient and route the email to the correct inbox.

Advantageously, the process further comprises providing a predefined list of indications and receiving a user input selecting an indication from the predefined list of indications. A wide variety of different indications could be used to indicate a relationship to the original recipient, some of which are mentioned above, such as "manager" or "pa", but others are of course possible, such as "junior", "attorney", "cover", etc. The user can be provided with a list of such indications (for example after selecting the "+" in the address filed) via a drop-down menu, or the email client can autocomplete the indication, to assist the user.

In one embodiment, the method further comprises receiving a second indication of a third recipient of the message, the second indication defining a relationship to the second recipient, obtaining an address for the third recipient, and transmitting the email message to the third recipient. The use of the indication to designate a recipient of the email can also be nested in the sense that the indication can refer to a previous indication. Such an email address, following on from the example above, might look like this: "bob@companyabc+manager+pa". In this case, the three recipients are Bob, Bob's manager, and Bob's manager's pa. Predefined nomenclature will need to be used to ensure that the nesting is correct, and that the manager's pa is intended rather than Bob's pa.

In one embodiment, the method of routing the email further comprises storing the (or each if more than one) indication with the email message, and transmitting the (or each) indication, with the email message, to the first and second recipients. A significant advantage is delivered if the indication is maintained with the email message, as whenever any resolution of the indication is executed, then the up-to-date address of the relevant recipient is used. In this way, if the identity of the person who is filling the role has changed, then the message will be routed to the new person. For example, if the method further comprises responding to the email message then the server will and obtain an address for the (or each) recipient defined by an indication.

As described in one embodiment herein, the present invention deals with problems associated with conditions in which the level of alias indirection is not to a static individual occupying a distinct role, rather to one based on a relationship. An example of a problem that illustrates the need for email recipients to be identified by relationship rather than name or alias, occurs in a corporate environment where a message is sent an individual and copied to their manager. A previous solution for this is that at the time that the email message is created, the sender of the email will manually attach the email address of the recipient's manager either by knowing this in advance or, if they have access to a set of organizational charts, by doing a lookup of the manager to find their email address. The need to step outside of the email client to lookup an individual's manager, while addressing the email, interrupts the user and has the possibility of introducing errors and delays. One embodiment of the present invention addresses this problem by providing a solution wherein the lookup of the relationship and location of the email address is automated.

Another problem with locating an individual by their physical email address occurs when the recipient is actually intended to be a logical individual occupying a particular current relationship role is further compounded by the situation in which email messages are acted upon and then replied to, sometimes many times, before they become closed and the issue is resolved. An example of this might be an email asking for approval for an expense report, an email concerning an award, some disciplinary action, or any email conversation where "reply to all" is being used to further the discussion. One embodiment of the present invention addresses this problem by providing an inventive system that adapts to changes in role within an organization, such that the routing of emails will be correct, even for later replies to an email message. The indication defining the relationship is carried with the email message, and will always be used to resolve the address of the recipient at the time that any reply is made. Therefore in the example of an address that includes "+manager", if the identity of the manager should change after the first email is sent, then when the email is replied to, the relevant server will resolve that indication (+manager) to send the reply email to the new manager.

As discussed above, the invention is not restricted to having a single known recipient and a single additional recipient identified by their relationship to the known recipient, but can accommodate scenarios where multiple additional recipients can be identified by their relationship to a known recipient. This can be achieved by chaining the relationship identifiers. For example "fred@companyabc.com+manager+pa" can be used to send an e-mail to Fred at companyabc and to Fred's manager and Fred's pa. Separate recipients in an e-mail are typically separated by a comma, so fred@companyabc.com+manager, bill@companyabc.com+manager can be used to send an e-mail to Fred at companyabc and Fred's manager and Bill at companyabc and Bill's manager. Chaining can be used as well so "fred@companyabc+manager+manager" can be used to send an e-mail to Fred at company abc, Fred's manager, and also to Fred's manager's manager. This use of chaining recipients identified by relationships can spread the e-mail through an organization via its relational structures, and also to target individuals by their relationships to known individuals or known roles.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), and writable storage media (e.g., hard disk drive, read/write CD ROM, optical media). It should be understood, therefore, that such storage media when encoded with computer readable instructions that direct method functions in the present invention, represent alternative embodiments of the present invention. Further, it is understood that the present invention may be implemented by a system having means in the form of hardware, software, or a combination of software and hardware as described herein or their equivalent.

It will be understood by those skilled in the art that, although the present invention has been described in relation to the preceding example embodiments, the invention is not limited thereto and that there are many possible variations and modifications which fall within the scope of the invention.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims is not to be construed as meaning "consisting only of."

The invention claimed is:

1. A computer-implemented method of routing an email message, the computer-implemented method comprising:
    executing, in a processor, computer program instructions that, when executed, perform a process comprising:
    receiving an email message for a first recipient, wherein the first recipient is represented in a TO field of the email message;

receiving a first indicator for a second recipient of the email message, wherein the first indicator defines a relationship between the first recipient and the second recipient, and wherein the first indicator is represented in a CC field of the email message;

resolving the first indicator at a remote server by referring to an organization chart of a business enterprise to determine a role of the second recipient in the business enterprise with respect to the first recipient;

obtaining an address for the second recipient by utilizing the first indicator; and transmitting the email message to the first recipient and the second recipient.

2. The computer-implemented method of claim 1, further comprising:

receiving a second indicator for a third recipient of the email message, wherein the second indicator defines a relationship between the second recipient and the third recipient;

obtaining an address far the third recipient; and transmitting the email message to the third recipient by utilizing the second indicator.

3. The computer-implemented method of claim 1, further comprising:

incorporating the first indicator and a second indicator into the email message, wherein the second indicator defines a relationship between the second recipient and a third recipient; and transmitting the first indicator and the second indicator with the email message, to the first recipient and the second recipient, wherein a recipient is enabled to respond to the email message by obtaining an address for each recipient defined by the first indicator and the second indicator.

4. The computer-implemented method of claim 1, further comprising:

accessing a predefined list of indicators that describe relationships between multiple entities, wherein the multiple entities are defined by roles within an enterprise;

receiving a user input selecting a specific indicator from the predefined list of indicators; and transmitting the email message to a recipient that is described by the specific indicator.

5. The computer-implemented method of claim 1, wherein the relationship between the first recipient and the second recipient is defined in an organizational chart.

6. The computer-implemented method of claim 5. wherein the relationship between the first recipient and the second recipient is dynamic, and wherein changes to the relationship are automatically reflected in the organization chart and the first indicator.

7. A system for routing a message, said system comprising:
a processor, a computer readable memory, and a computer readable storage media;
first program instructions for receiving an email message to be routed;
second program instructions for receiving details of a first recipient of the email message, wherein the first recipient is represented in a TO field of the email message;
third program instructions for receiving a first indicator of a second recipient of the email message, the first indicator defining a relationship between the first recipient and the second recipient, and wherein the first indicator is represented in a CC field of the email message;
fourth program instructions for resolving the first indicator at a remote server by referring to an organization chart of a business enterprise to determine a role of the second recipient in the business enterprise with respect to the first recipient;
fifth program instructions for obtaining an address for the first recipient;
sixth program instructions for obtaining an address for the second recipient by utilizing the first indicator; and
seventh program instructions for transmitting the email message to the first and second recipients; and wherein the first, second, third, fourth, fifth, sixth, and seventh program instructions are stored on the computer readable storage media for execution by the processor via the computer readable memory.

8. The system of claim 7, further comprising:
eighth program instructions for receiving a predefined user input, wherein the predefined user input indicates that a subsequent user input is said first indicator that defines the relationship between the first recipient and the second recipient; and wherein the eighth program instructions are stored on the computer readable storage media for execution by the processor via the computer readable memory.

9. The system of claim 7, further comprising:
eighth program instructions for receiving a second indicator of a third recipient of the email message, wherein the second indicator defines a relationship between the second recipient and the third recipient;
ninth program instructions for obtaining an address for the third recipient; and
tenth program instructions for transmitting the email message to the third recipient by utilizing the second indicator; and wherein the eighth, ninth, and tenth program instructions are stored on the computer readable storage media for execution by the processor via the computer readable memory.

10. The system of claim 7, further comprising:
eighth program instructions for incorporating the first indicator and a second indicator into the email message, wherein the second indicator defines a relationship between the second recipient and a third recipient; and
ninth program instructions for transmitting the first indicator and the second indicator, with the email message, to the first and second recipients; and wherein the eighth and ninth program instructions are stored on the computer readable storage media for execution by the processor via the computer readable memory.

11. The system of claim 10, further comprising:
tenth program instructions for responding to the email message and obtaining an address for each recipient defined by the first indicator and the second indicator; and wherein the tenth program instructions are stored on the computer readable storage media for execution by the processor via the computer readable memory.

12. The system of claim 7, further comprising:
eighth program instructions for accessing a predefined list of indicators that describe relationships between multiple entities, wherein the multiple entities are defined by roles within an enterprise;
ninth program instructions for receiving a user input selecting a specific indicator from the predefined list of indicators; and
tenth program instructions for transmitting the email message to a recipient that is described by the specific indicator; and wherein the eighth, ninth, and tenth program instructions are stored on the computer readable storage media for execution by the processor via the computer readable memory.

13. A non-transitory computer readable storage medium comprising a set of computer executable instructions that, when executed, performs the process of:
- receiving an email message to be routed to a first recipient, wherein the first recipient is represented in a TO field of the email message; and
- receiving an indicator of a second recipient of the email message, wherein the indicator defines a relationship between the first recipient and the second recipient of the email message, wherein the indicator is represented in a CC field of the email message;
- resolving the indicator at a remote server by referring to an organization chart of a business enterprise to determine a role of the second recipient in the business enterprise with respect to the first recipient;
- obtaining an address for the second recipient by utilizing the indicator; and
- transmitting the email message to the first recipient and the second recipient.

14. The non-transitory computer readable storage medium of claim 13, further comprising computer executable instructions for:
- receiving a predefined user input, wherein the predefined user input indicates that a subsequent user input is said first indicator that defines the relationship between the first recipient and the second recipient.

15. The non-transitory computer readable storage medium of claim 13, further comprising computer executable instructions for:
- receiving a second indicator of a third recipient of the email message, wherein the second indicator defines a relationship between the second recipient and the third recipient of the email message;
- obtaining an address for the third recipient; and
- transmitting the email message to the third recipient by utilizing the second indicator.

16. The non-transitory computer readable storage medium of claim 13, further comprising computer executable instructions for:
- incorporating the first indicator and a second indicator into the email message, wherein the second indicator defines a relationship between the second recipient and a third recipient; and
- transmitting the first indicator and the second indicator, with the email message, to the first and second recipients.

17. The non-transitory computer readable storage medium of claim 16, further comprising computer executable instructions for:
- responding to the email message and obtaining an address for each recipient defined by the first indicator and the second indicator.

18. The non-transitory computer readable storage medium of claim 13, further comprising computer executable instructions for:
- accessing a predefined list of indicators that describe relationships between multiple entities, wherein the multiple entities are defined by roles within an enterprise;
- receiving a user input selecting a specific indicator from the predefined list of indicators; and
- transmitting the email message to a recipient that is described by the specific indicator, 19. A computer-implemented method of routing an email message, the computer-implemented method comprising:
- executing, in a processor, computer program instructions that, when executed, perform a process comprising:
- receiving an email message for a first recipient of the email message, wherein the first recipient is represented in a TO field of the email message;
- receiving a user input selecting a specific indicator from a predefined list of indicators, wherein the predefined list of indicators describes relationships between multiple workers according to roles of the multiple workers within an enterprise, and wherein the specific indicator describes a relationship between the first recipient and a second recipient of the email message, wherein the predefined list of indicators is represented in a CC field of the email message;
- resolving the specific indicator at a remote server by referring to an organization chart of a business enterprise to determine a role of the second recipient in the business enterprise with respect to the first recipient;
- obtaining an address for the second recipient by utilizing the specific indicator; and
- transmitting the email message to the second recipient that is identified by the specific indicator.

\* \* \* \* \*